(12) United States Patent
Hanses et al.

(10) Patent No.: US 9,099,795 B2
(45) Date of Patent: Aug. 4, 2015

(54) TERMINAL ARRANGEMENT

(75) Inventors: Markus Hanses, Höxter (DE);
Wendelin Simon,
Schieder-Schwalenberg (DE); Heinrich Heise, Horn-Bad Meinberg (DE);
Andreas Wöhrmeier, Dörentrup (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 58 days.

(21) Appl. No.: 13/577,328

(22) PCT Filed: Mar. 1, 2011

(86) PCT No.: PCT/EP2011/052989
§ 371 (c)(1),
(2), (4) Date: Sep. 27, 2012

(87) PCT Pub. No.: WO2011/107458
PCT Pub. Date: Sep. 9, 2011

(65) Prior Publication Data
US 2013/0034991 A1   Feb. 7, 2013

(30) Foreign Application Priority Data

Mar. 1, 2010   (DE) .......................... 10 2010 009 807

(51) Int. Cl.
*H01R 11/20* (2006.01)
*H01R 4/24* (2006.01)
*H01R 4/26* (2006.01)
*H01R 9/26* (2006.01)
(Continued)

(52) U.S. Cl.
CPC .. *H01R 9/26* (2013.01); *H01R 4/24* (2013.01);
*H01R 4/26* (2013.01); *H01R 9/18* (2013.01);
*H01R 11/20* (2013.01); *H01R 13/502* (2013.01)

(58) Field of Classification Search
USPC ......... 439/441, 507, 764, 816, 814, 834, 828, 439/367, 715; 174/58, 59, 135; 361/622
See application file for complete search history.

(56) References Cited

U.S. PATENT DOCUMENTS 3,289,049 A    11/1966   Middendorf
5,645,447 A *   7/1997   Sandor .......................... 439/467
(Continued)

FOREIGN PATENT DOCUMENTS

CN    1998114 A      7/2007
DE    39 42 519 A1   6/1991
(Continued)

OTHER PUBLICATIONS

Russian Office Action dated Feb. 20, 2014 in Russian Patent Application No. 2012141524/07(066886).
(Continued)

*Primary Examiner* — Abdullah Riyami
*Assistant Examiner* — Harshad Patel
(74) *Attorney, Agent, or Firm* — Knobbe, Martens, Olson & Bear LLP

(57) ABSTRACT

The invention relates to a terminal arrangement comprising a housing (12) having a first housing half (14) and a second housing half (16), wherein at least one electric terminal (18) is implemented on the housing (12), wherein the electric terminal (18) comprises a connection region (20) for connecting a conductor, wherein according to the invention the connecting region (20) is implemented as a single piece.

11 Claims, 2 Drawing Sheets

Figure 1:
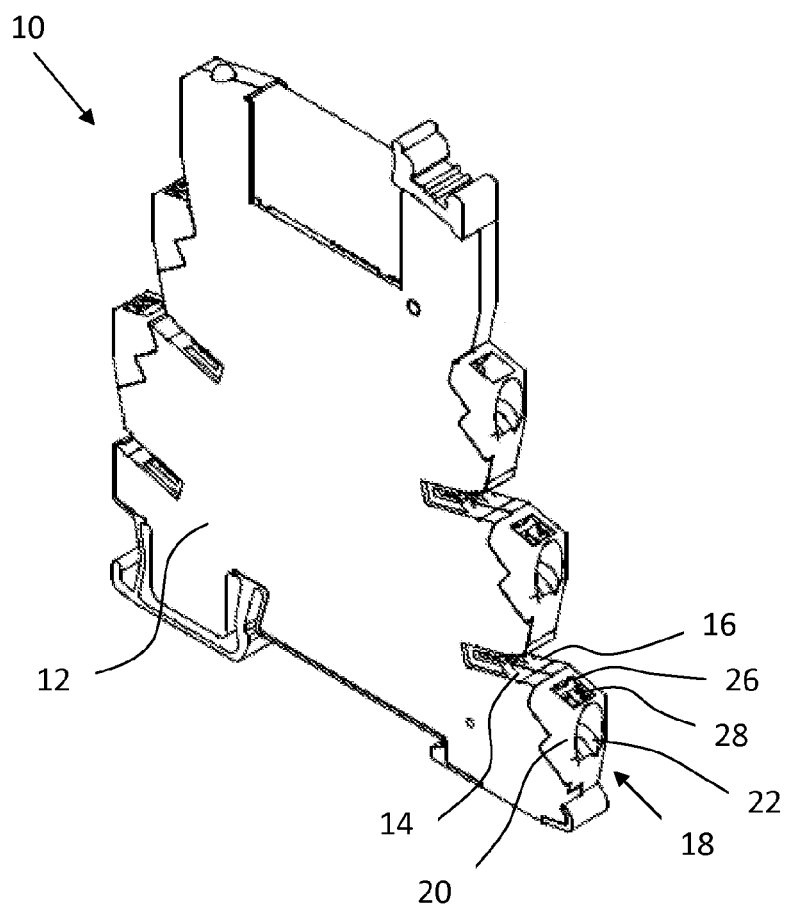

(51) Int. Cl.
*H01R 9/18* (2006.01)
*H01R 13/502* (2006.01)

(56) References Cited

U.S. PATENT DOCUMENTS

| | | | |
|---|---|---|---|
| 5,685,735 A * | 11/1997 | Hohorst | 439/441 |
| 5,895,286 A * | 4/1999 | Linke | 439/441 |
| 6,052,059 A | 4/2000 | Jaegar | |
| 6,806,424 B2 * | 10/2004 | Gerving | 174/59 |
| 6,911,602 B2 | 6/2005 | Conrad | |
| 2007/0178747 A1 * | 8/2007 | Schrader | 439/441 |
| 2008/0096441 A1 * | 4/2008 | Eppe et al. | 439/816 |
| 2009/0098768 A1 | 4/2009 | Giefers | |
| 2009/0207571 A1 | 8/2009 | Heggemann et al. | |
| 2009/0260964 A1 | 10/2009 | Orban et al. | |
| 2010/0081316 A1 * | 4/2010 | Eppe et al. | 439/441 |

FOREIGN PATENT DOCUMENTS

| | | |
|---|---|---|
| DE | 43 37 254 A1 | 5/1995 |
| DE | 197 47 590 A1 | 5/1998 |
| DE | 197 22 936 C1 | 10/1998 |
| DE | 299 09 766 U1 | 10/2000 |
| DE | 600 00 963 T2 | 9/2003 |
| DE | 103 30 631 A1 | 2/2004 |
| DE | 10 2004 013757 A1 | 10/2005 |
| DE | 10 2004 042 427 A1 | 11/2007 |
| DE | 20 2008 002 113 U1 | 6/2009 |
| JP | 61-74962 | 5/1986 |
| JP | 2000-58155 A | 2/2000 |
| JP | 2007-287583 A | 11/2007 |
| WO | WO 0189037 A1 | 11/2001 |

OTHER PUBLICATIONS

Chinese Office Action dated Sep. 23, 2014 in Chinese Application No. 201180008596.4.
European Office Action dated Dec. 3, 2014 in European Application No. 11705895.8.
German Office Action dated Nov. 8, 2010 in German Application No. 102010009807.8-34.
Japanese Office Action dated Oct. 25, 2013 in Japanese Application No. 2012-555393.
Publication and International Search Report for application WO2011/107458 published Sep. 9, 2011.

* cited by examiner

TERMINAL ARRANGEMENT

The invention relates to a terminal arrangement that can preferably be arranged on a support rail.

Such terminal arrangements are preferably disc-shaped, wherein multiple terminal arrangements can be arranged consecutively on a support rail to form one unit. A terminal arrangement typically has a housing that can be assembled from a first housing half and a second housing half. Multiple terminal arrangements having a connection region for connecting a conductor are typically implemented within the housing. The connection itself is typically made at a spring loaded terminal or a screw terminal disposed within the connection region. The connection region is usually formed by the two housing halves of the housing, so that the force applied to the connection region required to introduce the conductor can cause the two assembled housing halves to be pushed apart when inserting the conductor into the connection region.

The purpose of the invention is thus to provide a terminal arrangement wherein the two housing halves cannot be pushed apart, even if the force exerted on the connection region is increased.

The problem is solved according to the invention by the features of claim 1. Advantageous embodiments of the invention are set forth in the subordinate claims.

The terminal arrangement according to the invention comprises a housing having a first housing half and a second housing half, wherein at least one electric terminal is implemented on the housing, the terminal comprises a terminal housing for connecting an electric conductor, wherein according to the invention the connection region is implemented as a single piece.

The connection region is preferably the region of the terminal through which the conductor can be inserted into the terminal. The terminal arrangement according to the invention is characterized in that the connection region is no longer divided in two halves but implemented as a single piece, thus preventing the regions around the connection region, particularly the housing halves, from being pushed apart. The connection region as well as the terminal arrangement as a whole thus exhibits an improved stability, so that an increased force can be applied to the connection region during the insertion of the conductor without pushing the housing halves apart.

The connection region is preferably connected to the first housing half or the second housing half. In this way, the connection region can be formed together with one of the housing halves, thus enabling precise positioning of the connection region on the housing.

Furthermore, it is advantageously provided that the connection region comprises an overlapping cover, wherein the cover comprises an opening in the region for inserting the conductor into the terminal, and/or the cover comprises an opening in the region of a push button actuator. The connection region itself can be formed as a type of cover to implement the connection region as a single piece. Furthermore, the single piece connection region may additionally be formed by a cover formed as an additional part, which can be positioned on top, to further stabilize the connection region. The cover may fully encompass the connection region. This enables a particularly stable formation of the connection region. In this case, the cover comprises an opening in the region for inserting the conductor into the terminal and/or the cover comprises an opening in the region of a push button actuator, if a spring loaded element is provided within the connection region.

The cover is preferably formed as a single piece with the first housing half or the second housing half. In this way, the cover can be formed together with one of the two housing halves, thus enabling very precise positioning of the cover on one of the two housing halves. If the connection region itself is not formed as a type of cover, but the cover is formed around the single piece connection region, the cover may also be implemented as a single piece with the connection region.

Furthermore, the connection unit and/or the cover are preferably implemented as injection molded parts. This facilitates the manufacturing process of the connection region and/or the cover, and the connection unit and/or the cover can be injection molded as a single piece with one of the two housing halves. The provided openings can be formed in the cover during the injection molding process itself, thus making the manufacturing process of the terminal arrangement particularly fast and inexpensive.

In the following, the invention is explained in greater detail with reference to the accompanying drawings by way of a preferred embodiment.

Figure 2:
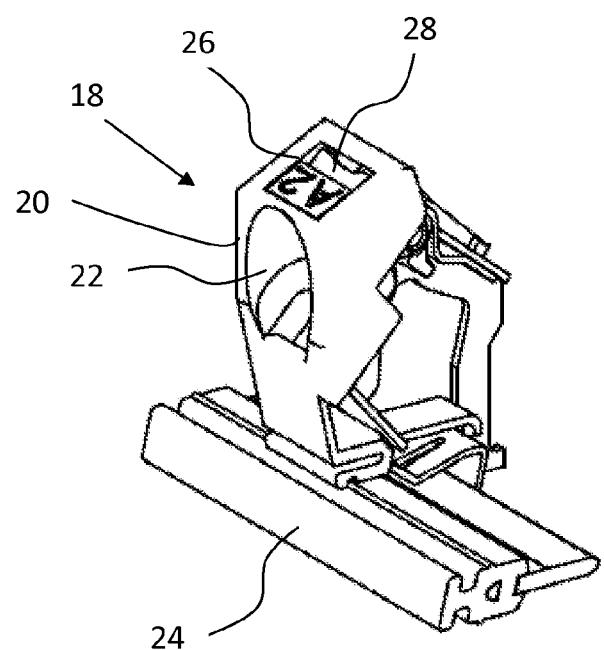

FIG. 1 shows a schematic diagram of a terminal arrangement according to the invention; and FIG. 2 shows a schematic diagram of a terminal according to the invention of the terminal arrangement shown in FIG. 1.

FIG. 1 shows a terminal arrangement 10 according to the invention having a housing 12 formed of a first housing half 14 and a second housing half 16, wherein the two housing halves 14, 16 are assembled to form the housing 12. Multiple electric terminals 18 are implemented on the housing 12, wherein the terminals 18 each have a connection region 20 for connecting a conductor (not shown), wherein the connection region 20 is implemented as a single piece, thus preventing that the housing halves 14, 16 are pushed apart when a conductor is inserted. The connection region 20 can be connected to one of the two housing halves 14, 16, wherein the connection region 20 is preferably implemented as a single piece with one of the two housing halves 14, 16.

In the embodiment shown here, as seen in FIG. 2, the connection region 20 is formed as a type of encompassing cover, encompassing a region for the insertion of a conductor into the terminal 18 as well as a region having a push button actuator 28 for actuating a spring loaded element disposed in the terminal 18 (not shown). An opening 22 is provided in the region for inserting a conductor in the cover, into which a conductor can be inserted to connect to terminal 18. The opening 22 is encompassed by the cover so that the force applied when inserting the conductor can be absorbed by the single piece connection region 20 or the encompassing cover, thereby preventing the force from being transferred to the two housing halves 14, 16. Additionally, the cover comprises a second opening 26 having the push button actuator 28 located therein. The cover and/or the connection region 20 are preferably implemented as injection molded parts, which can be formed with one of the two housing halves 14, 16 in one manufacturing step through injection molding. FIG. 2 shows a terminal 18 according to the invention separately from the terminal connection of FIG. 1, wherein an opening with a jumper 24 inserted therein is formed below the terminal 18.

LIST OF REFERENCE NUMBERS terminal arrangement 10
housing 12
first housing half 14
second housing half 16
terminal 18
connection region 20
opening 22
jumper 24 opening 26
push button actuator 28

The invention claimed is:

1. A terminal arrangement, comprising:
a housing having a first housing half and a second housing half, the first and second housing halves being two separate pieces that abut each other to form a cavity therebetween;
a plurality of electric terminals on the housing, wherein each electric terminal comprises a connecting component connected to each of the first and second housing halves, wherein at least two connecting components are connected to the same side of the housing or to opposite sides of the housing and face away from each other,
wherein each of the connecting components is a single piece article and has an overlapping cover portion,
wherein the overlapping cover portion has at least one opening formed therethrough for inserting a conductor into the terminal or for housing a push button actuator, wherein the overlapping cover portion forms an encompassing cover around a portion of the first housing half or a portion of the second housing half, such that when the conductor is being inserted into the terminal or when the push button actuator is being accessed, the two housing halves are prevented from being separated.

2. The terminal arrangement of claim 1, wherein the each connecting component including the overlapping cover portion forms an integral part of at least one of the first housing half or the second housing half as a single piece article.

3. The terminal arrangement of claim 1, wherein the each connecting component including the overlapping cover portion is an injection-molded part.

4. The terminal arrangement of claim 1, wherein the connecting component and the at least one of the first housing half or the second housing half comprise a single injection-molded part.

5. The terminal arrangement of claim 1, wherein the overlapping cover has the opening configured to receive the conductor and the opening configured to house the push button actuator.

6. The terminal arrangement of claim 5, wherein the connecting component further comprises the push button actuator.

7. The terminal arrangement of claim 1, wherein the connecting component is integrally connected to the first housing half to form a single piece article while overlapping and encompassing a portion of the second housing half such that the first and second housing halves are prevented from being pushed apart when a conductor is inserted through the at least one opening or when the push button actuator is being accessed.

8. The terminal arrangement of claim 6, wherein the connecting component houses a spring-loaded element that is actuated by the push button actuator for connecting conductors to the electric terminals.

9. The terminal arrangement of claim 1, wherein the at least two connecting components are attached on the same side of the housing.

10. The terminal arrangement of claim 1, wherein the at least two connecting components are attached on opposite sides of the housing.

11. The terminal arrangement of claim 1, wherein at least two connecting components are attached on the same side of the housing and at least two connecting components are attached on an opposite side of the housing facing away from the at least two connecting components attached on the same side.

\* \* \* \* \*